United States Patent [19]

Knoerzer et al.

[11] Patent Number: 5,330,831
[45] Date of Patent: Jul. 19, 1994

[54] PRINTABLE HIGH BARRIER MULTILAYER FILM

[75] Inventors: Anthony R. Knoerzer; Leland W. Reid, both of Fairport, N.Y.

[73] Assignee: Mobil Oil Corp., Fairfax, Va.

[21] Appl. No.: 811,126

[22] Filed: Dec. 20, 1991

[51] Int. Cl.⁵ .............................. B32B 7/12
[52] U.S. Cl. .................... 428/353; 428/463; 428/520; 428/910; 428/522; 428/35.8; 428/36.7
[58] Field of Search ............... 428/353, 463, 516, 518, 428/522, 349, 517, 910, 36.7, 33.8

[56] References Cited

U.S. PATENT DOCUMENTS

| | | | |
|---|---|---|---|
| 3,719,629 | 3/1973 | Martin et al. | 260/33.2 |
| 4,564,559 | 1/1986 | Wagner, Jr. et al. | 428/349 |
| 4,927,689 | 5/1990 | Markiewicz | 428/34.8 |
| 5,102,699 | 4/1992 | Beeson | 427/379 |

*Primary Examiner*—Edith Buffalow
*Attorney, Agent, or Firm*—Alexander J. McKillop; Malcolm D. Keen; Dennis P. Santini

[57] ABSTRACT

A film combination includes (a) an oriented polymeric substrate which in its unmodified state is susceptible of transmitting oxygen and water vapor; (b) a primer coating on the substrate; (c) a layer of cross-linked polyvinyl alcohol on the primer layer; and (d) on the cross-linked layer a layer of a blend of (1) a polyvinyl alcohol homo or copolymer and (2) an ethylene-acrylic acid copolymer.

7 Claims, No Drawings

PRINTABLE HIGH BARRIER MULTILAYER FILM

BACKGROUND OF THE INVENTION

This invention relates to a multilayer packaging film having good barrier characteristics, good printability and the ability to receive a firmly bonded metal layer thereon.

Certain polymeric films e.g., polypropylene, employed for the packaging of foods, inherently permit the transmission of oxygen and water vapor from outside of the film to inside of a package made up of the film. Oxygen and water vapor permits rapid deterioration of foods packaged in containers made from such a film. Metal deposits on such films are desired because of the improvement in appearance and in providing yet another layer which militates against the invasion of oxygen and water vapor.

Thus, it is a principal object of the present invention to present a film which has excellent printability, can have a metal layer firmly bonded thereto and which has significantly decreased oxygen and water vapor transmission rates.

SUMMARY OF THE INVENTION

The present invention is concerned with a film combination comprising:

(a) an oriented polymeric substrate susceptible in its unmodified form of transmitting oxygen and water vapor;

(b) a primer coating on at least one surface of said substrate (a);

(c) a layer of cross-linked polyvinyl alcohol on said coating (b); and (d) a layer of the blend of (1) a polyvinyl alcohol homo or copolymer and (2) an ethylene-acrylic acid copolymer.

It is preferred that the substrate layer be corona discharge treated prior to receipt of the primer coating.

DETAILED DESCRIPTION OF THE INVENTION

The substrates contemplated herein include any polymeric film substrate which inherently permits the transmission of oxygen and water vapor and wherein the utility of such film for packaging purposes would call for a minimization of such transmission. In most cases the source of oxygen and water vapor is atmospheric oxygen and water vapor. While nylon, polyethylene teraphthaplate, polycarbonate etc., films are contemplated herein, the particularly preferred class of films are the polyolefins. Within the polyolefins class, homopolymer and copolymers of propylene are preferred. Particularly preferred are isotatic propylenes containing at least 80% by weight of isotatic polypropylene. The preferred base substrate layer can be homopolypropylene having a melting point range of from about 321° to about 336° F. Commercially available materials of this description include Exxon 4252 and ARCO W472. The preferred substrate can also be coextruded with a thin skin layer amounting from about 2-12% of the total thickness of a copolymer of propylene and another olefin, e.g., ethylene, butene-1, etc. The other olefin can be present in the copolymer in an amount from about 1-7 wt%.

In order to effectively inhibit the amount of oxygen and water vapor transmitted through the base layer, the base layer must be (1) treated to a surface free energy of at least about 35 dynes/cm, (2) have a primer coating applied thereto, (3) have a coating of a layer of a cross-linked polyvinyl alcohol homopolymer or copolymer applied thereto, and (4) have a layer of a blend of a polyvinyl alcohol homo or copolymer and a ethylene-acrylic acid copolymer applied thereto.

The preferred substrate must be properly prepared to receive the primer layer, followed by application of the cross-linked polyvinyl alcohol. This proper treatment involves treating the surface to a surface tension level of at least about 35 and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred with corona discharge treatment being particularly preferred.

Commercially available corona discharge treatment equipment can be obtained from Solo Systems, Inc., Garland, Tex.; Corotec Corporation, Collinsville, Conn.; Softal Electronics, Hamburg, W. Germany; and others. Using, for example, Softal Electronics equipment, a treater can have an air gap of about 0.050 in. when treating polypropylene film of about 0.9 mils. The film can be treated to 42–44 dynes/cm. After this treatment, a suitable primer material is coated onto the treated surface.

Preferred primer materials are those disclosed in U.S. Pat. No. 4,564,559 the disclosure of which is completely incorporated herein. These include a primer produced by condensing a monoaldehyde with an interpolymer of acrylamide or methacrylamide and at least one other unsaturated monomer. Further included is a material resulting from condensing aminoaldehyde with acrylamide or methacrylamide and subsequently interpolymerizing the condensation product with at least one other unsaturated monomer in the presence of a $C_1$-$C_6$ alkanol. A preferred primer coating resin of this type comprises a copolymer containing up to 90% by weight of styrene, up to 80% by weight of an alkyl alkylate, up to 15% by weight of methacrylic acid and 5% to 25% by weight of acrylamide which has been condensed with a solution of formaldehyde in n-butanol containing from 0.2 to 3 equivalents of formaldehyde for each amine group in the copolymer. Another primer resin of this type is a 50% solid solution of a copolymer resin containing 38.5 parts of styrene, 44 parts of ethyl acrylate, 2.5 parts of methacrylic acid and 15 parts of acrylamide which has be condensed with 5.2 parts of formaldehyde in n-butanol.

A particularly preferred primer material for the structure contemplated herein has been found to be poly(ethyleneimine). The amine primer provides an overall adhesively active surface for thorough and secure bonding with the subsequently applied cross-linked polyvinyl alcohol. It has been found that an effective coating solution concentration of the poly(ethyleneimine) applied from either aqueous or organic solvent media, such as ethanol, is a solution comprising about 0.1–0.6% by weight of the poly(ethyleneimine). A commercially available material of this type is known as Polymin P, a product of BASF-Wyandotte Corporation.

Another particularly preferred primer material is the reaction product of an epoxy resin with an acidified aminoethylated vinyl polymer. The contemplated epoxy resins are glycidyl ethers of polyhydroxy compounds. Typical polyhydroxy compounds which may be used include bisphenol A, ring-substituted bisphenol A, resorcinol, hydroquinone, phenol-formaldehyde, Novolac resins, aliphatic diols, such as ethylene glycol, propylene glycol, 1,4-butanediol, 1,6-hexane-diol, glycerol, lower alkyl hydantoins and mixtures thereof. The preferred epoxy resins of the present invention are those made by the glycidation reaction between epichlorohydrin and bisphenol A. Epoxy resins of this type are commonly classified by their epoxy equivalent weight (EEW) which is defined by the weight of resin in grams which contains one gram equivalent of epoxy groups. Resins with an EEW ranging from 170 to 280 may be used in the present invention, but the preferred range is 180 to 210.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer composition of the present invention is an amino modified acrylic polymer which is water soluble. This polymer is a curing agent for the epoxy compound. The preferred material is described in U.S. Pat. No. 3,719,629, the disclosure of which is incorporated herein by reference. This material may be generically described as an acidified aminoethylated interpolymer having pendent aminoalkylate groups. This material is produced by polymerizing acrylate, methacrylate, styrene or other suitable monomers with sufficient methacrylic or acrylic acids to give a —COOH content of about 7.5 to about 12.5%. Solvent polymerization techniques are preferred. The polymer is then reacted with ethyleneimine monomer and acidified with hydrochloric acid to render the polymer water soluble.

In one embodiment of the present invention, a liquid epoxy resin is emulsified in a solution of the curing agent by rapid stirring, the resultant dispersion is diluted with water to the desired concentration for coating, usually from about 2 to about 20% solids. When mixing the epoxy resin with the curing agent, it is generally preferred to use a stochiometric equivalent balance of epoxy and amine groups. However, it has been found that the stochiometric ratio may be varied over a wide range, from about 1 epoxy to about 3 amine groups through 3 epoxy groups to 1 amine group.

The polyvinyl alcohol employed herein can be any commercially available material. For example, ELVANOL 71-30, an E. I. DuPont product. The polyvinyl alcohol coating solution is prepared by dissolving the polymer in hot water, cooling and mixing both with a suitable cross-linking agent and an acid catalyst. The cross-linking agent can be a melamine- or urea-formaldehyde resin. Commercially available cross-linkers also would include PAREZ 613, a methylated melamine formaldehyde; CYMEL 373, a methylated melamine formaldehyde; CYMEL 401, a trimethylol melamine urea formaldehyde; glyoxal, borax, etc. An acid catalyst, e.g., ammonium sulfate, ammonium chloride, sulfuric acid, nitric acid and ammonium nitrate, etc., will effectively catalyze these systems.

Cross-linking is carried out to make the polyvinyl alcohol less moisture sensitive but it is essential that this does not occur before the coating weight is applied and evenly distributed. This is effected by making up the aqueous solution so that the initial concentration is too low for this to occur but, as drying occurs, the concentration increases and the rate of cross-linking is heightened.

Suitable concentrations have been found to be from 3 to 10, preferably from 4 to 8 wt% of the solution being polymer plus cross-linking agent plus catalyst. If the solids content is higher, the solution becomes too viscous; if lower, good water resistance is not obtained. From about 10% to 30%, typically 15% cross-linking agent is used with from 0.5% to 4.5%, typically 2% of the acid catalyst. A preferred formulation comprises the following solids content: 85.5 wt% polyvinyl alcohol; 12.8 wt% methylated melamine formaldehyde; and 1.7 wt% ammonium chloride ($NH_4Cl$).

The aqueous polyvinyl alcohol solution was prepared by dissolving sufficient ELVANOL 71-30 in hot water to form an 8 wt% solution which was then cooled. To this solution was added a 20 wt% aqueous melamine formaldehyde solution and a 5 wt% aqueous ammonium chloride solution to provide the preferred formulation recited above.

By cross-linking the underlying layer of polyvinyl alcohol, the moisture resistance of the polyvinyl alcohol is dramatically improved. The over-lying blend layer of polyvinyl alcohol and ethylene-acrylic acid copolymer provides a surface that is excellently printable and metallizable.

The final layer of the multilayer film structure is made up of a blend of noncross-linked polyvinyl alcohol homopolymer or copolymer and ethylene-acrylic acid copolymer. The polyvinyl alcohol is the same polyvinyl alcohol as described above. The ethylene acrylic acid copolymer is produced by the high pressure copolymerization of ethylene and acrylic acid. When ethylene is copolymerized with acrylic acid, the molecular structure is significantly altered by the random inclusion of bulky carboxylic acid groups along the back-bone and side chains of the copolymer. The carboxyl groups are free to form bonds and interact with any polar substrate. They can also hydrogen bond together to yield toughness. The carboxyl groups tend to inhibit crystallization which results in clarity, low melting and softening point for the film. The ethylene-acrylic acid copolymers consist essentially of about 96 mol% methylene groups, thus, their water resistance is understandably similar to that of polyethylene. The ammonium salts of the copolymers permit water dispersions of the material to be formed which facilitates ease of topical application to surfaces. These copolymers can be formed having melt indexes ranging from about 300–3,000. Commercially available examples of these copolymers are PRIMACOR 4983 (Dow Chemical Co.) an aqueous dispersion having 25% solids content and obtained from a reaction between approximately 15 mol% acrylic and a 5 mol% ethylene; and Michem 4983 available from Michaelman Corporation.

In preparing the blend of the polyvinyl alcohol homopolymer or copolymer and the ethylene-acrylic acid copolymer, the components can range from 1:2 to 2:1 by weight. In preparing a roughly 2:1 blend in an aqueous dispersion for example, 10 parts of Vinol 325 (a 98% hydrolyzed medium viscosity polyvinyl alcohol, obtained from Air Products) can be mixed with 90 parts by weight of Michem 4983 (an ethylene-acrylic acid copolymer obtained from Michaelman Corporation). The Michem 4983 has a solids content of about 25%. This combination, adjusted to an aqueous 5% solid solution will provide the polyvinyl alcohol to ethylene-acrylic acid copolymer mixture in a ratio of approximately 2:1. The blended layer can have a metal layer deposited thereon. A metal of choice is aluminum.

EXAMPLE

A homopolymer polypropylene film with a biaxial orientation of 4-5 times MD and 7-10 times TD was corona discharge treated to a wetting tension of about 42 dynes/cm. The treated film was precoated on both sides with 0.1 wt% poly(ethyleneimine), i.e. Polymin M, a product of BASF-Wyandotte Corp. The film was air-dried at a 100° C. This coating weight was too low to be measured but is calculated to be in the range of 0,001 grams per 1000 in$^2$. A commercially available acrylic heat seal layer is applied to one side. The opposite surface of the film structure was coated with a formulation comprising 85.5 wt% polyvinyl alcohol, 12.8 wt% methylated melamine formaldehyde and 1.7 wt% ammonium chloride. The solution was applied utilizing a reverse direct gravure coater and the coated film was passed through a dry-air oven at from 100°-125° C. This produced a coating wt of 0.5 g/m$^2$. After allowing the polyvinyl alcohol 3 days to partially cross-link, the film was recoated with the polyvinyl alcohol/ethylene-acrylic acid copolymer mixture. The coating weight of this mixture was 0.05 g/msi. The following table shows oxygen transmission data and ink adhesion data.

TABLE

| Ink | Ink Pick-off | Oxygen Transmission | | |
|---|---|---|---|---|
| | | 100% RH | 50% RH | 0% RH |
| Solvent Based Nulam Blue Ink | 0%[1] | 53.88[2] | 0.108[2] | 0.023[2] |
| Water Based Aqualam P White Ink | 0% | | | |

[1]Used 610-3M tape
[2]cc/100 in$^2$/24 hr

The resulting film had high barrier properties having excellent printability.

What we claim is:
1. A film combination comprising:
 (a) an oriented polymeric substrate which in its unmodified state is susceptible of transmitting oxygen and water vapor in an amount which is detrimental to product packaged by said substrate;
 (b) a primer coating on at least one surface of said substrate (a);
 (c) a layer of cross-linked polyvinyl alcohol on said coating (b); and
 (d) on said cross-linked layer a layer of a blend of (1) a polyvinyl alcohol homo or copolymer and (2) an ethylene-acrylic acid copolymer.
2. The film combination of claim 1 wherein substrate layer (a) has been treated to a surface free energy of at least about 35 dynes/cm.
3. The combination of claim 2 wherein said substrate comprises a homopolymer or copolymer of propylene.
4. The combination of claim 3 wherein the weight ratio of the blend of (d) is from 2:1 to 1:2.
5. The combination of claim 4 wherein said blend is of polyvinyl alcohol and ethylene-acrylic acid copolymer.
6. The combination of claim 5 having a metal layer deposited on said blend layer.
7. The combination of claim 6 wherein said metal is aluminum.

* * * * *